United States Patent [19]
Chen

[11] Patent Number: 5,389,855
[45] Date of Patent: Feb. 14, 1995

[54] MULTI-BEAM ELECTRON GUN FOR MONOCHROME CRT

[75] Inventor: Hsing-Yao Chen, Barrington, Ill.

[73] Assignee: Chunghwa Picture Tubes, Ltd., Yangmei, Taiwan, Prov. of China

[21] Appl. No.: 16,590

[22] Filed: Feb. 10, 1993

[51] Int. Cl.$^6$ .................. H01J 29/46; H01J 29/56
[52] U.S. Cl. ........................ 315/14; 313/409
[58] Field of Search ............. 315/368.17, 14, 365; 313/409, 410, 411, 348, 447

[56] References Cited

U.S. PATENT DOCUMENTS

| | | | |
|---|---|---|---|
| 3,975,766 | 8/1976 | Sano et al. | 358/65 |
| 4,361,781 | 11/1982 | Depp et al. | 313/409 |
| 4,500,808 | 2/1985 | McCandless | 313/409 |
| 4,616,160 | 10/1986 | Holtey et al. | 315/365 |
| 4,633,142 | 12/1986 | Marshall | 315/365 |
| 4,853,601 | 8/1989 | Odenthal | 315/14 |

OTHER PUBLICATIONS

D. L. Say, A Multibeam CRT, Information Display, May 1970, Information Display Publications pp. 29–34.

*Primary Examiner*—Theodore M. Blum
*Attorney, Agent, or Firm*—Emrich & Dithmar

[57] ABSTRACT

A multi-beam electron gun for use in a monochrome cathode ray tube (CRT) such as used in a black and white television receiver, a projection television receiver, or a computer monitor includes G1 control and G2 screen grids each having a plurality of vertically aligned apertures for forming electron beams which are deflected in unison across the CRT's display screen to simultaneously trace a plurality of vertically spaced, horizontal scan lines with each display screen sweep. The electron beams are deflected across the screen in a raster-like manner with each beam containing video information for each adjacent scan line. The G1 control grid includes a plurality of discrete conductive portions each including a respective beam passing aperture and each coupled to a respective video signal source, with the video signal sources including memory for storing video signal information for subsequent display. This permits plural adjacent scanning electron beams to simultaneously provide adjacent portions of the same frame of a video image on the display screen. The grids in the main lens portion of the electron gun include vertically elongated, common apertures for focusing each of the electron beams on the display screen, with the electron beams deflected by a vertically oriented, self-convergent magnetic deflection yoke. In another embodiment, each of a plurality of vertically aligned apertures in the G1 grid has an associated cathode, with a respective video signal provided to each of the cathodes for simultaneously writing video information on adjacent horizontal scan lines on the video display.

36 Claims, 9 Drawing Sheets

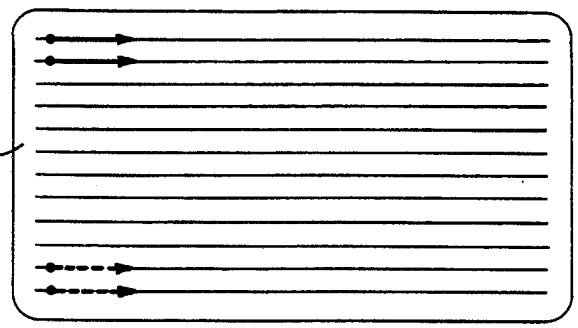
FIG. 6
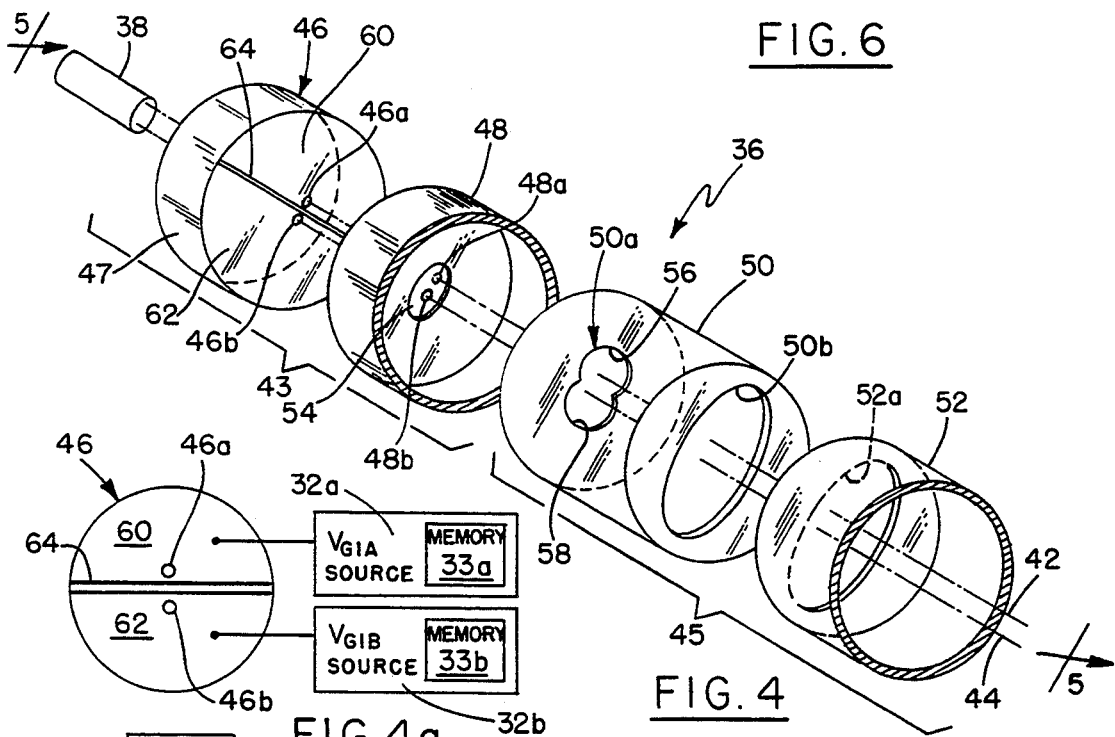
FIG. 4
FIG. 4a
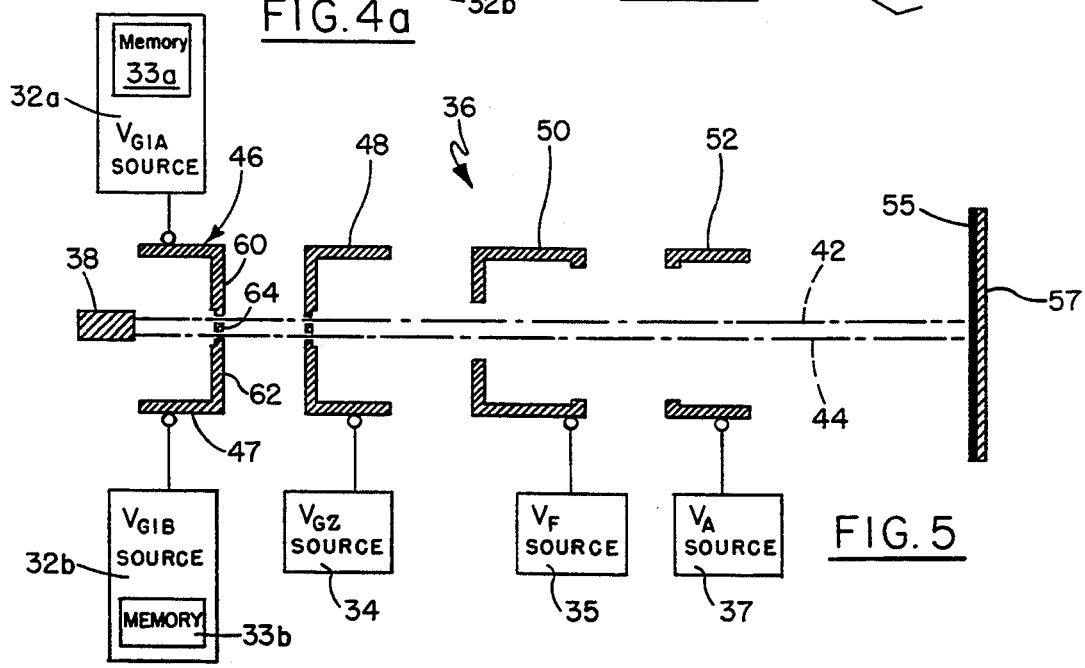
FIG. 5

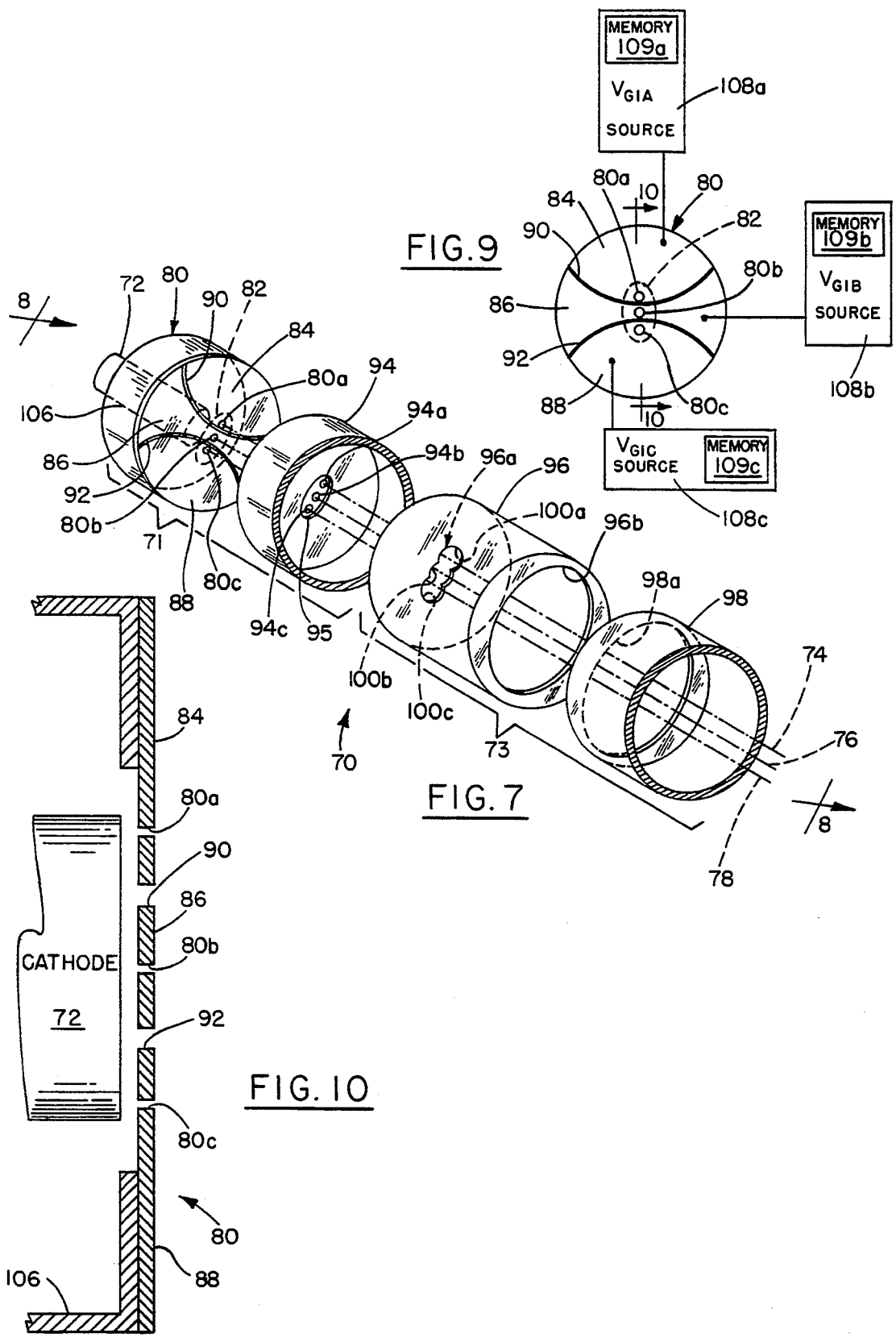

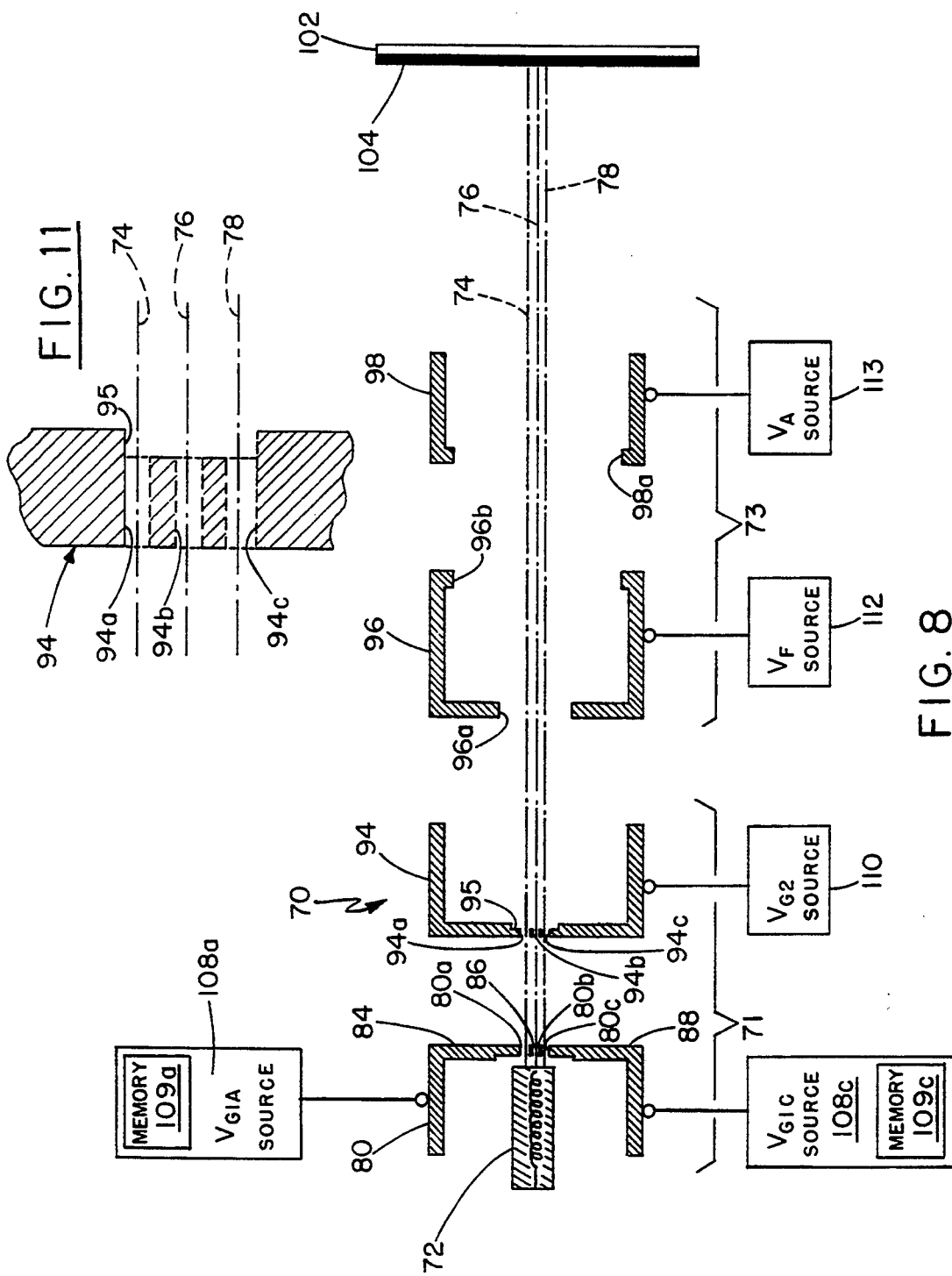

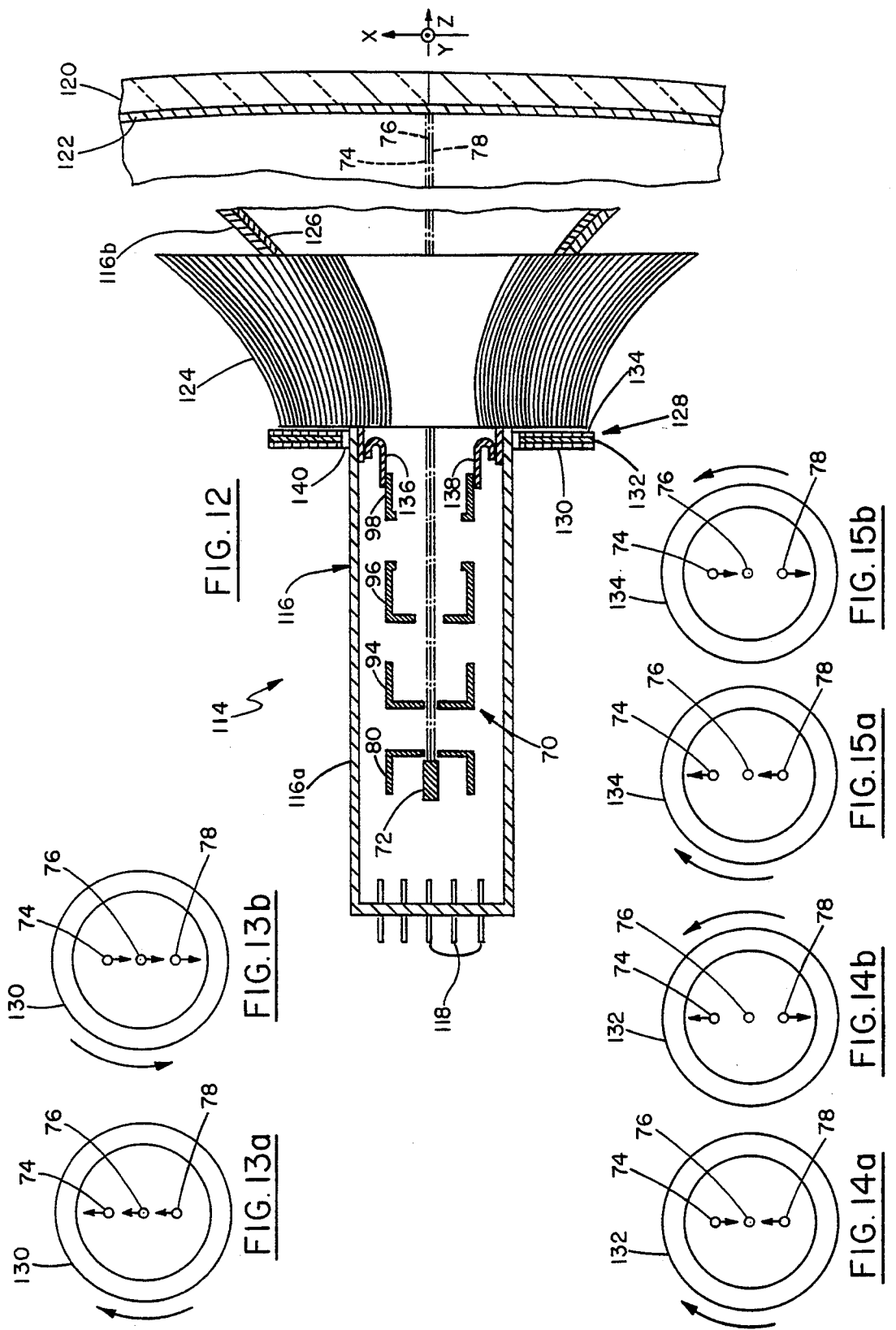

MULTI-BEAM ELECTRON GUN FOR MONOCHROME CRT

FIELD OF THE INVENTION

This invention relates generally to monochrome cathode ray tubes (CRTs) and is particularly directed to a multi-beam electron gun for use in a monochrome CRT.

BACKGROUND OF THE INVENTION

Over the past three decades, due to increasing advances in and general acceptance of color television, monochrome CRT design and development efforts have been directed almost exclusively toward use in computer monitors, projection television receivers, and very high resolution medical applications. Color CRTs employ a plurality of electron beams, each beam providing a primary color, while a monochrome CRT makes use of a single electron beam, where in both cases the electron beam, or beams, are horizontally swept across the CRT's display screen in a raster-like manner. The most important operating criteria for a monochrome CRT display are typically high video image resolution and brightness. Unfortunately, these two operating criteria are inter-related such that improvement in one performance parameter generally has an adverse effect on the other.

Other important monochrome CRT performance criteria relate to the magnetic deflection yoke scan frequency and cathode electron emission density. A high deflection yoke scan frequency is generally required for high video image resolution, while high electron emission density is required to provide a high level of video image brightness and resolution. Increased deflection yoke scan frequencies not only require increased input power, but also substantially increase the cost of the CRT deflection yoke. To maintain a high level of video image brightness without diminishing image resolution, a dispenser cathode is sometimes incorporated in the CRT. Dispenser cathodes are expensive, however, costing approximately 50 times more than a conventional oxide cathode.

Video image brightness is also a concern in projection television receivers. A conventional electrostatic focusing electron gun cannot meet both the beam spot size (resolution) and brightness operating criteria because of the large size of a projection television receiver display. A combined electrostatic and magnetic focusing arrangement is typically employed in a high definition television (HDTV) system, which increases the complexity and cost over that of a conventional electron gun and deflection yoke system. In addition, in a high resolution electron gun due to a high video drive frequency, the capacitance of the cathode has to be reduced to 2 pf, or less, which requires a specialized design of increased cost. In the past, multi-beam electron gun designs such as the one described in the May, 1970 edition of Information Display in an article entitled "A Multi-Beam CRT" by D. L. Say, have been too complicated to be practical and have thus not been incorporated in a commercial product.

Referring to FIG. 1, there is shown an isometric view partially in phantom of a typical prior art single beam electron gun 10 for use in a monochrome CRT. A sectional view of the electron gun 10 shown in FIG. 1 taken along site line 2—2 therein is shown in FIG. 2. Electron gun 10 includes a heated cathode 12 which provides energetic electrons in the general direction of a G1 control grid 16 having an aperture 16a through which the energetic electrons travel. Electron gun 10 further includes a G2 screen grid 18 aligned with the G1 control grid 16 and also including a center aperture 18a through which the energetic electrons travel. The G1 control and G2 screen grids 16, 18 provide a beam forming region (BFR) 28 in electron gun 10 for forming the energetic electrons emitted by cathode 12 into an electron beam 14 shown in dotted-line form in the figures. Electron gun 10 further includes a G3 grid 20 and a G4 grid 22 each generally cylindrical and aligned along the electron gun's longitudinal axis Z—Z'. The G3 grid 20 includes an aperture 20a in an end thereof for passing the electron beam 14 toward the cylindrical, open G4 grid 22. The combination of the G3 and G4 grids 20, 22 forms a high voltage focusing lens 30 for focusing the electron beam 14 on the CRT's display screen, or faceplate, 24 shown in FIG. 2. Disposed on the inner surface of the CRT's display screen 24 is a phosphor layer 26 which emits light in response to the electron beam 14 incident thereon.

An elevation view of the CRT's display screen 24 is shown in FIG. 3 which also illustrates the horizontal scan lines 25 over which the electron beam is displaced in tracing out a video image on the display screen. For simplicity, only 12 scan lines are shown in the figure, it being understood that there are many more horizontal scan lines in the typical CRT. The beginning of electron beam trace of the first horizontal scan line is shown by the arrow in the upper left-hand corner of FIG. 3, while the beginning of electron beam trace of the last horizontal scan line is shown by the arrow in dotted-line form in the lower left-hand corner of the figure. The electron beam is traced across the display screen 24 in a raster-like manner in proceeding from left to right and from top to bottom as viewed in FIG. 3. Each horizontal sweep by the electron beam of faceplate 24 provides a single horizontal line of the video image displayed thereon. Electron gun 10 is typical of those used in conventional monochrome CRTs which generally suffer from the design and operating limitations discussed above.

The present invention addresses the aforementioned limitations of the prior art by providing a multi-beam electron gun for a monochrome CRT which does not require costly electron beam magnetic focusing, high electron emission density cathode, or a high frequency magnetic deflection yoke.

OBJECTS AND SUMMARY OF THE INVENTION

Accordingly, it is an object of the present invention to provide a multi-beam electron gun for a monochrome CRT wherein each beam simultaneously traces out a discrete portion of a video image on the display screen.

It is another object of the present invention to form a video image on the display screen of a monochrome CRT by tracing a plurality of vertically spaced electron beams in unison across the CRT, with each beam modulated according to the position of the particular picture element provided by that beam.

Yet another object of the present invention is to provide an electron gun for a monochrome CRT which offers the advantages of small beam spot size and high brightness without an expensive high emission density cathode or a complicated combined electrostatic and magnetic focusing arrangement.

A further object of the present invention is to provide a multi-beam electron gun for a monochrome CRT wherein each beam simultaneously provides a discrete portion of a video image on the CRT's display screen allowing for a reduced beam deflection frequency rate and increased beam dwell time for enhanced video image brightness.

A still further object of the present invention is to provide a multi-beam electron gun for a monochrome CRT wherein each beam simultaneously writes adjacent discrete portions of a video image across the CRT's display screen allowing for a reduced current for each of the beams and enhanced electron beam spot resolution while maintaining high image brightness.

These objects of the present invention are achieved and the disadvantages of the prior art are eliminated by an electron gun for a monochrome cathode ray tube (CRT) including a display screen whereon a video image is formed by sweeping an incident electron beam generally horizontally over a plurality of successive vertically spaced, horizontal scan lines in a raster-like manner. The electron gun includes a cathode for directing energetic electrons into a low voltage beam forming region (BFR) disposed adjacent to the cathode and including first and second spaced charged grids respectively having first and second arrays of spaced apertures for forming the energetic into a plurality of beams. Each of the first and second arrays of apertures are aligned generally vertically, with each aperture of the first array aligned with a respective aperture in the second array so as to form the energetic electrons into a plurality of spaced, generally vertically aligned electron beams. The electron gun further includes a high voltage focusing lens disposed intermediate the BFR and the CRT's display screen for focusing the electron beams as vertically aligned, spaced spots on the display screen, wherein each electron beam is simultaneously swept over a respective scan line in forming adjacent portions of a video image on the display screen. Discrete video signal information is provided to respective conductive portions in the first grid, where each conductive portion encompasses a respective aperture for allowing each beam to simultaneously write a portion of the video image on the screen during each horizontal sweep. Another embodiment contemplates providing respective video signals to a plurality of vertically aligned cathodes, where each cathode is aligned with a respective aperture in the G1 control grid, which is maintained at a selected voltage, to simultaneously write video information on a plurality of adjacent horizontal scan lines on the video display.

The limitations of the prior art are overcome and the aforementioned objects and advantages are realized also by a G1 control grid for a monochrome cathode ray tube (CRT) also in accordance with the present invention which is adapted to receive energetic electrons from a cathode and includes at least upper and lower conductive portions each adapted for coupling to a respective video signal source. The G1 control grid further includes an insulating gap disposed intermediate the upper and lower conductive portions and first and second vertically aligned, generally circular apertures respectively disposed in the upper and lower conductive portions, wherein each of the apertures forms the energetic electrons into a respective electron beam.

Another embodiment of the invention contemplates three vertically aligned electron beams in a monochrome CRT wherein a common video signal modulates each of the beams and wherein all of the beams simultaneously scan across a common horizontal scan line.

Still another embodiment of the invention contemplates a plurality of horizontally aligned electron beams in a monochrome CRT wherein a common video signal modulates each of the beams which form respective horizontally spaced spots on a common scan line of the display screen. By delaying the video signal in a timed manner provided to one or more of the horizontally spaced electron beams, each beam writes the same video information for each location on the horizontal scan line in a sequential manner. This sequential writing of the same video information to each location on the video display by plural electron beams affords enhanced video image brightness without increasing beam charge density.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4 is a simplified isometric view shown partially in phantom of a multi-beam electron gun for use in a monochrome CRT in accordance with one embodiment of the present invention;

FIG. 4a is an elevation view of the G1 control grid of the electron gun shown in FIG. 4 also illustrating in simplified block diagram form video signal drivers coupled to the G1 control grid in accordance with one embodiment of the present invention;

FIG. 5 is a generally vertical, longitudinal sectional view of the inventive electron gun shown in FIG. 5 taken along site line 5—5 therein;

FIG. 6 is a simplified elevation view of a CRT display screen illustrating the manner in which the display screen is scanned by a plurality of electron beams in accordance with one embodiment of the present invention;

FIG. 7 is a simplified isometric view shown partially in phantom of another embodiment of a multi-beam electron gun for a monochrome CRT in accordance with the principles of the present invention;

FIG. 8 is a generally vertical, longitudinal sectional view of the electron gun shown in FIG. 7 taken along site line 8—8 therein;

FIG. 9 is an elevation view of the G1 control grid of the electron gun of FIG. 7 illustrating in simplified block diagram form the manner in which video signals are provided to the G1 control grid;

FIG. 10 is a vertical sectional view of the G1 control grid shown in FIG. 9 taken along site line 10—10 therein;

FIG. 11 is a sectional view of a portion of the G2 screen grid of the electron gun shown in FIG. 8 illustrating the transit of the three electron beams through apertures in the grid;

FIG. 12 is a partial vertical sectional view of a monochrome CRT including a multi-beam electron gun in accordance with the present invention;

FIGS. 13a and 13b are simplified schematic diagrams of a two-pole magnet used in the magnetic convergence arrangement of the CRT shown in FIG. 12 for aligning the three electron beams;

FIGS. 14a and 14b are simplified schematic diagrams of a four-pole magnet in the magnetic convergence arrangement of the CRT shown in FIG. 12 for aligning the three electron beams;

FIGS. 15a and 15b are simplified schematic diagrams of a six-pole magnet used in the magnetic convergence arrangement of the CRT shown in FIG. 12 for aligning the three electron beams;

DETAILED DESCRIPTION OF THE PREFERRED EMBODIMENTS

Figure 3:
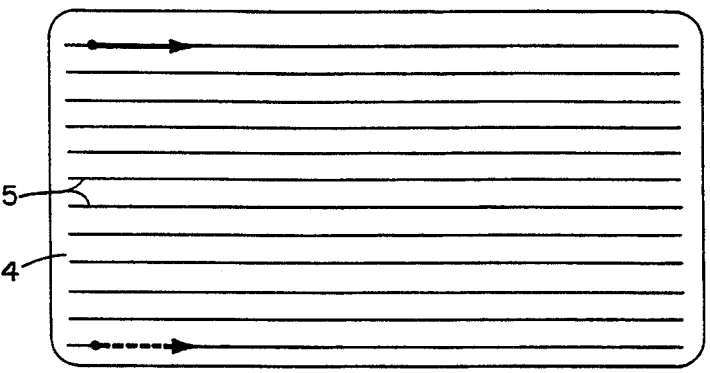
FIG. 3 is a simplified elevation view of a CRT display screen illustrating the manner in which the display screen is raster scanned by an electron beam in forming a black and white image thereon.
Figure 1:
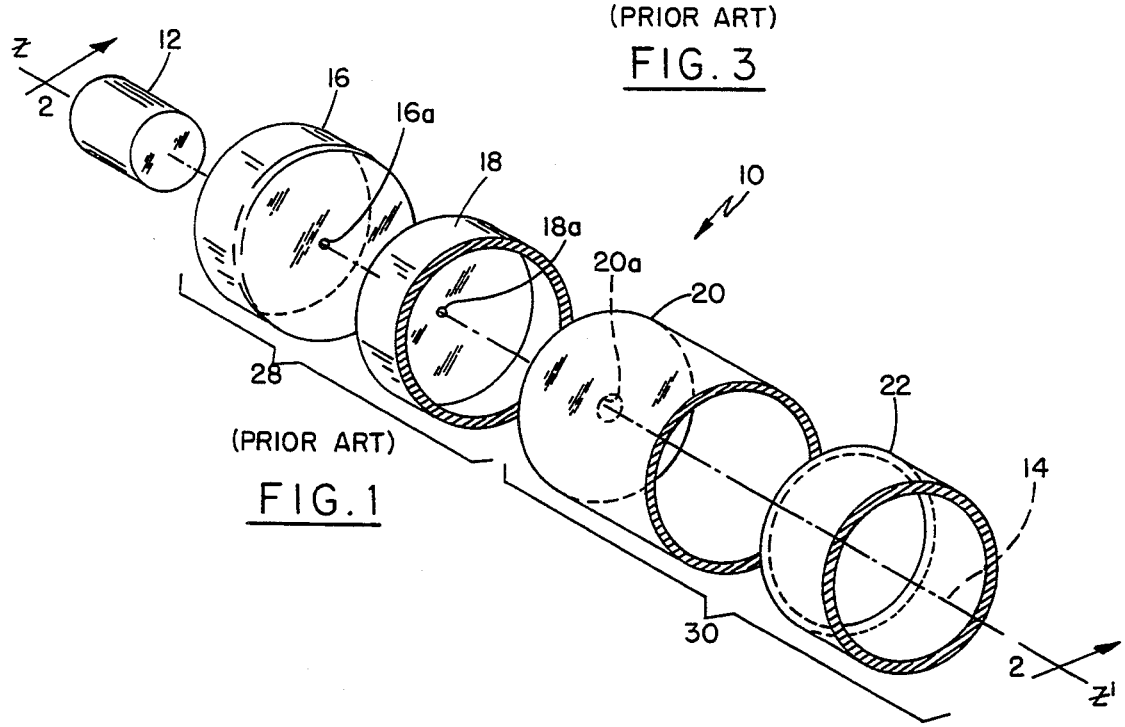
FIG. 1 is a simplified isometric view shown partially in phantom of a prior art electron gun such as used in a conventional monochrome CRT.

Referring to FIG. 4, there is shown a simplified isometric view partially in phantom of a multi-beam electron gun 36 for a monochrome CRT in accordance with the principles of the present invention. FIG. 5 is a longitudinal vertical sectional view of the electron gun 36 shown in FIG. 4 taken along site line 5—5 therein. Electron gun 36 includes a cathode 38 for providing energetic electrons in the direction of a G1 control grid 46. Additional details of the G1 control grid 80 are shown in the elevation view of FIG. 4a. Electron gun 36 is of the bi-potential type. The G1 control grid 46 in combination with a G2 screen grid 48 provides a beam forming region (BFR) 43 in electron gun 36 for forming the energetic electrons into a pair of spaced, vertically aligned electron beams 42 and 44. Electron gun 36 further includes the combination of a G3 grid 50 and a G4 grid 52 which, in combination, form a high voltage focusing lens 45 for focusing electron beams 42 and 44 on the display screen 57 of a CRT. The bottom side of the G3 grid 50 includes a figure-8 shaped aperture 50a having generally circular upper and lower portions 56 and 58, while the top side of the G3 grid includes a vertically elongated aperture 50b. The bottom side of the G4 grid 52 similarly has a vertically elongated aperture 52a. Disposed on the inner surface of display screen 57 is a phosphor layer, or coating, 55 for emitting light in response to the electron beams 42, 44 incident thereon in forming a video image on the display screen.

The G1 control grid 46 and the G2 screen grid 48 each have a respective open end, where the G1 control grid's open end faces cathode 38 and the G2 screen grid's open end faces the G3 grid 50. The closed end of the G1 control grid 46 includes first and second spaced, vertically aligned apertures 46a and 46b which pass respective electron beams 42 and 44 toward the G2 screen grid 48. The G2 screen grid similarly includes first and second spaced, vertically aligned apertures 48a and 48b for respectively passing electron beams 42 and 44 in the direction of the high voltage focusing lens 45. The closed end of the G2 screen grid 48 includes an inner coined, or recessed, portion 54 incorporating first and second apertures 48a and 48b which facilitates formation of the apertures in the closed end of the G2 screen grid. The G2 screen grid 48 is preferably metallic and is coupled to a $V_{G2}$ source 34 for maintaining the G2 screen grid at a given voltage. Similarly, the G3 grid 50 is coupled to a focus voltage ($V_F$) source 35, while the G4 grid 52 is coupled to an anode ($V_A$) voltage source 37.

The G1 control grid 46 includes first and second thin conductive portions 60 and 62 disposed on its closed end. The G1 control grid 46 further includes an underlying non-conductive ceramic substrate for providing support for conductive portions 60, 62. The first and second conductive portions 60, 62 may be formed on the closed end of the G1 control grid 46 by attaching a conductive metal layer to its closed end, followed by forming a separating gap 64 between upper and lower conductive portions such as by chemical etching. The conductive metal layer may be applied to the G1 control grid 46 in a conventional manner such as by brazing or crimping. The separating gap 64 extends the width of the G1 control grid 46 and electrically isolates the first and second conductive portions 60, 62 from one another. Each of the conductive portions 60, 62 encloses a respective one of the grid's first and second apertures 4a and 46b allowing each of the electron beams to be separately modulated by respective signals provided to the first and second conductive portions.

Coupled respectively to the first and second conductive portions 60, 62 are a $V_{G1A}$ video signal source 32a and a $V_{G1B}$ video signal source 32b. Each of the $V_{G1B}$ and $V_{G1B}$ video signal sources 32a and 32b provide respective video signals to the first and second conductive portions 60, 62 for modulating the electron beams respectively passing through apertures 46a and 46b. In this manner, a first portion of a video image on the CRT's display screen is provided by the first electron beam 42 passing through the first aperture 46a, while an adjacent portion of the video image is provided by the second electron beam 44 passing through the second aperture 46b.

Referring to FIG. 6, there is shown a simplified elevation view of the CRT's display screen 57 and the manner in which a video image is formed thereon by means of electron gun 36 shown in FIGS. 4 and 5. As shown in the upper left-hand portion of FIG. 6, the first and second electron beams are incident upon the display screen 57 in the form of a pair of vertically aligned spots which are displaced rightward as shown by the direction of the arrows in the figure along respective horizontal scan lines by means of the CRT's magnetic deflection yoke which is not shown for simplicity. When the first and second electron beams 42, 44 reach the right-hand margin of the display screen 57, they are quickly deflected leftward to begin tracing the third and fourth scan lines across the display screen. This scanning and retrace sequence continues until the two electron beams scan the last two horizontal scan lines as shown in dotted-line form in the lower left-hand portion of FIG. 6. Upon completion of scanning the bottom two scan lines on display screen 57 the first and second electron beams 42, 44 undergo retrace by means of the magnetic deflection yoke and are positioned so as to initiate re-trace of the first two scan lines at the top of display screen 57. By simultaneously tracing two or more horizontal scan lines, electron beam scan frequency and deflection frequency rate are reduced as are the yoke power requirements. This allows for the use of simpler, cheaper magnetic deflection yokes. The reduction in beam scan frequency gives rise to a corresponding increase in the "dwell time" of the electron beams on the display screen's phosphor elements. Increasing electron beam dwell time allows for a corresponding reduction in electron beam peak current resulting in an improvement in electron beam spot size and video image resolution without sacrificing video image brightness. The increased video image resolution provided by the multi-beam electron gun 36 of the present invention is particularly adapted for use in very high resolution computer monitors, in monochrome CRTs used for medical applications, as well as in projection television receiver CRTs.

As shown in FIGS. 4a and 5, each of the $V_{G1A}$ and $V_{G1B}$ sources 32a and 32b includes a respective memory 33a and 33b. Each of the memories 33a and 33b is adapted for storing video data for subsequently writing the stored video data to its associated video signal source 32a, 32b for driving the first and second conductive portions 60 and 62 in accordance with the video image presented on the display screen 57. Each of the electron beams 42 and 44 is swept across a respective horizontal scan line on the display screen by means of a magnetic deflection yoke as described below. Each of the electron beams 42, 44 thus writes respective adjacent portions of the video image on the display screen 57. Where electron gun 36 is employed in a monochrome CRT such as in a television receiver, memories 33a and 33b store video data from the received television signal, which data is subsequently read from the memories and provided to a respective one of the first and second conductive portions 60, 62. This arrangement allows for simultaneous writing of video image information on adjacent portions of the display screen.

Referring to FIG. 7, there is shown partially in phantom an isometric view of another embodiment of a multi-beam electron gun 70 for a monochrome CRT in accordance with the principles of the present invention. FIG. 8 is a longitudinal vertical sectional view of the electron gun 70 shown in FIG. 7 taken along site line 8—8 therein. Electron gun 70 includes a source of energetic electrons in the form of a cathode 72. Disposed adjacent to cathode 72 is a beam forming region (BFR) 71 which includes the combination of a G1 control grid 80 and a G2 screen grid 94. Electron gun 70 further includes a high voltage focusing lens 73 disposed intermediate BFR 71 and the CRT's display screen 102 as shown in the sectional view of FIG. 8. The high voltage focusing lens 73 accelerates the electrons toward and focuses the electron beams on the CRT's display screen 102 which includes a phosphor layer 104 on an inner surface thereof for emitting light in response to the electron beams incident thereon. The G2 screen grid 94 is coupled to and charged by a $V_{G2}$ source 110 to a voltage on the order of +1000 V. The G3 grid 96 is similarly coupled to a $V_F$ source 112 and is typically maintained at a voltage on the order of +6500 V. Finally, the G4 grid 98 is coupled to and charged by an anode voltage $V_A$ source 113 and is typically maintained at approximately +25 kV.

The G1 control grid 80 is generally cylindrical having an open end which is adapted to receive cathode 72 and a closed end having three spaced, vertically aligned apertures 80a, 80b and 80c therein. The three apertures 80a, 80b and 80c are disposed in a coined, or recessed, portion 82 on the inner surface of the closed end of the G1 control grid 80. An elevation view of the closed end of the G1 control grid 80 is shown in FIG. 9 while a partial sectional view of the G1 control grid 80 is shown in FIG. 10 taken along site line 10—10 in FIG. 9. The G1 control grid 80 is preferably comprised of a ceramic substrate 106 having a closed end on the outer surface of which is disposed first, second and third conductive portions 84, 86 and 88. Each of the conductive portions is preferably comprised of a conductive metal and may be formed on the ceramic substrate 106 by brazing or pressing (crimping) a continuous metallic layer thereon. Portions of the metallic conductive layer are then removed such as by acid etching so as to form first and second insulating gaps 90 and 92 defining and separating the first, second and third conductive portions 84, 86 and 88. Each of the first, second and third conductive portions 84, 86 and 88 is essentially of the same area and all have essentially equal capacitance.

Three electron beams 74, 76 and 78 are formed by the G1 control grid 80 in combination with the G2 screen grid 94 which also is generally cylindrical having an open end and a closed end in facing relation to the G1 control grid. The closed end of the G2 screen grid 94 also includes a coined, or recessed, portion 95 on the inner surface thereof. Coined portion 95 is provided with three vertically aligned, spaced apertures 94a, 94b and 94c. Apertures 80a and 94a are in alignment, while apertures 80b and 80c are respectively aligned with apertures 94b and 94c. As shown in FIGS. 7 and 8, the three electron beams 74, 76 and 78 are formed by the two arrays of vertically aligned, spaced apertures in the G1 and G2 grids 80, 94, with the spacing between adjacent electron beams maintained as the beams transit the high voltage focusing lens 73 comprised of the G3 and G4 grids 96 and 98. The end portion of the G3 grid 96 in facing relation to the G2 screen grid 94 is provided with a vertically aligned, chain link-shaped aperture 96a. Aperture 96a includes upper, intermediate and lower enlarged portions 100a, 100b and 100c each aligned with a respective one of electron beams 74, 76 and 78. The opposed end of the G3 grid 96 includes an oval, common aperture 96b aligned generally vertically through which the three electron beams pass. The G4 grid 98 is also generally cylindrical, having an end wall in facing relation with the G3 grid 96, where the end wall also includes a vertically aligned, oval shaped common aperture 98a which passes the three electron beams 74, 76 and 78. The G2 screen grid 94 is coupled to a $V_{G2}$ voltage source 110, while the G3 and G4 grids are respectively coupled to focus voltage ($V_F$) and anode voltage ($V_A$) sources 112 and 113.

As shown in the elevation view of the G1 control grid 80 of FIG. 9, the first, second and third conductive portions 84, 86 and 88 are respectively coupled to and charged by a $V_{G1A}$ source 108a, a $V_{G1B}$ source 108b, and a $V_{G1C}$ source 108c. Each of the $V_{G1}$ sources provides a respective video signal to one of the conductive portions of the G1 control grid 80 for independently driving each conductive portion for controlling the three electron beams passing through apertures 80a, 80b and 80c. Apertures 80a, 80b and 80c are respectively disposed in and extend through the first, second and third conductive portions 84, 86 and 88. Variations in the video signals provided to each of the conductive portions controls the intensity of a respective electron beam and the content of a portion of a video image formed by that particular electron beam.

Each of the $V_{G1}$ sources 108a, 108b and 108c includes a respective video memory 109a, 109b and 109c. Each of the video memories 109a, 109b and 109c is adapted for storing video image data for subsequent writing to a respective one of the G1 grid's conductive portions for controlling a respective one of the electron beams passing through an aperture therein. Temporary storage of video data in the video memories allows the video data to be read from the memories and provided to the G1 grid's conductive portions such that the three beams contain video data for adjacent scan lines forming an image on the display screen 102. For example, video information in a received television signal for the upper electron beam 74 would be stored in memory 109a longer than the video data provided to the bottom electron beam 78 would be stored in memory 109c because both beams simultaneously trace out a portion of a video image although the data in the upper beam was received earlier.

Referring to FIG. 11, there is shown details of the G2 screen grid 94 where the three electron beams 74, 76 and 78 pass through the grid. An inner surface of the end portion of the G2 screen grid 94 includes a coined, or recessed portion 95 within which are disposed the three vertically aligned apertures 94a, 94b and 94c. Coining a portion of the end of the G2 screen grid 94 facilitates formation of the three vertically aligned beams passing apertures.

Figure 8A:
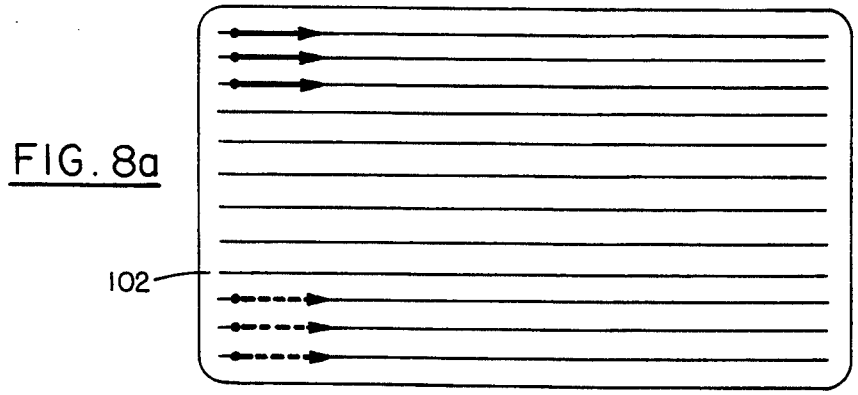
FIG. 8a is a simplified elevation view of a CRT display screen illustrating the manner in which three spaced, vertically aligned electron beams scan the display screen in forming a black and white image thereon in accordance with another embodiment of the present invention.
Figure 2:
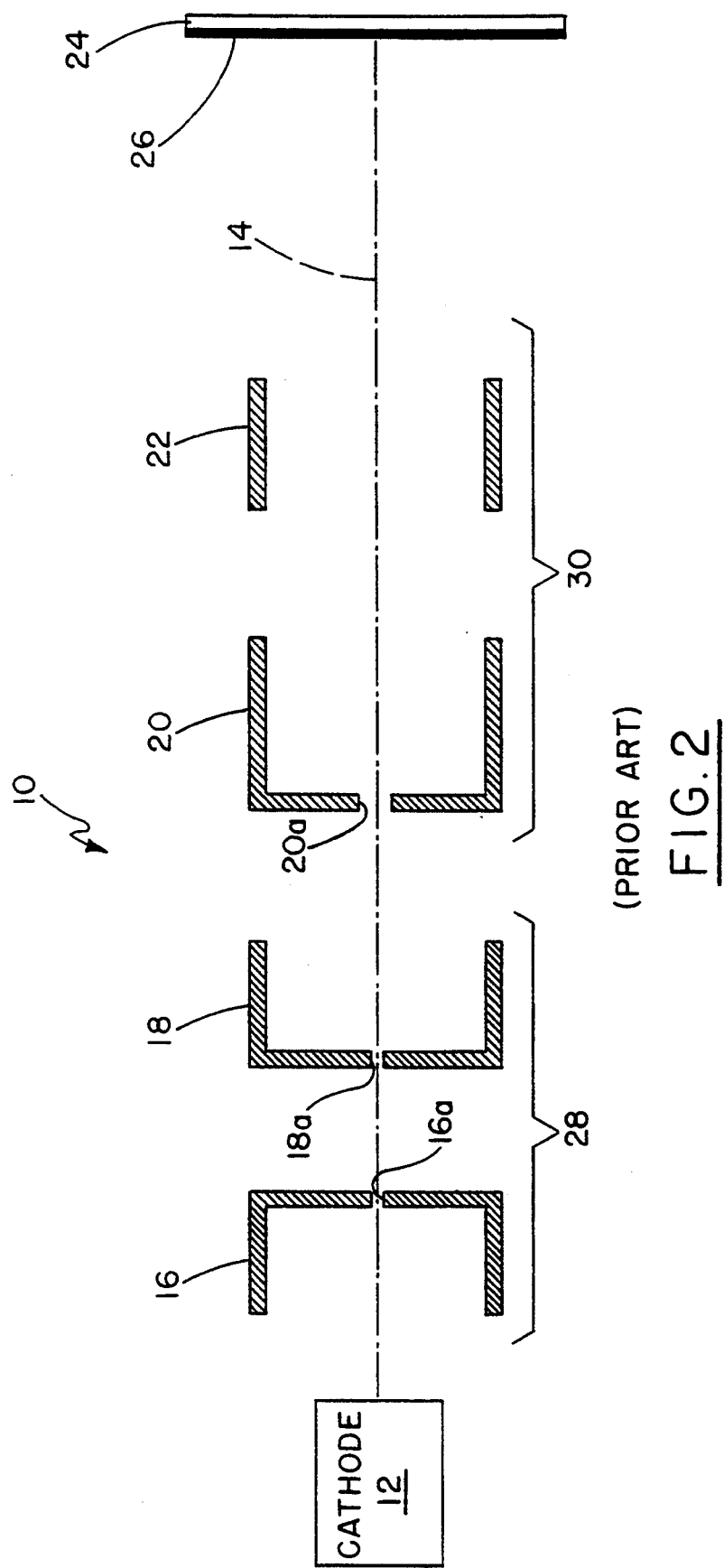
FIG. 2 is a longitudinal sectional view of the electron gun shown in FIG. 1 taken along site line 2—2 therein.

Referring to FIG. 8a, there is shown a simplified elevation view of CRT display screen 102 illustrating the manner in which the three electron beams of electron gun 70 simultaneously trace three adjacent horizontal scan lines in forming a video image on the display screen. As shown in the upper left-hand corner of display screen 102, the three electron beams form three vertically aligned spots on the display screen which are displaced in the direction of the arrows by means of a magnetic deflection yoke which is not shown in the figure for simplicity. The three electron beams are swept in unison across display screen 102 toward the right-hand edge of the screen, and are also displaced in unison to the left-hand margin of the screen during retrace. This alternating scan and retrace process continues until the last three horizontal scan lines on display screen 102 are traced as shown by the three dotted lines in the lower left-hand portion of the display screen, followed by retrace of the three beams to the upper left-hand corner of the display screen where scanning of the display screen is again initiated.

Referring to FIG. 12, there is shown a partial sectional view of a monochrome CRT 114 incorporating previously described electron gun 70 in accordance with the present invention. CRT 114 includes a glass envelope 116 with a cylindrical neck portion 116a and a funnel portion 116b of increasing diameter. CRT 114 further includes a plurality of stem pins 118 extending through the end of the neck portion 116a of the CRT to provide various electrical signals to electron gun 70 as well as to other components within the CRT's glass envelope 116. Also disposed within the CRT glass envelope 116 on the funnel portion 116b thereof is a conductive film 126a which is coupled to an anode voltage source which is not shown in the figure for simplicity. The G4 grid 98 is coupled to the internal conductive film 126 by means of a plurality of spaced, conductive positioning spacers 136 and 138 for charging the G4 grid to the anode voltage ($V_A$). A magnetic deflection yoke 124 is disposed about the CRT's funnel portion 116b for deflecting the electron beams over the display screen 120 in a raster-like manner. In a preferred embodiment, a self-converging magnetic deflection yoke which is aligned generally vertically rather than horizontally as in conventional inline color CRTs is used in the present invention.

As shown in FIG. 12, the three vertically aligned electron beams 74, 76 and 78 are incident upon the CRT's display screen 120 in a vertically spaced manner. This permits each of the electron beams 74, 76 and 78 to trace out a respective, adjacent horizontal scan line during each scan of the display screen 120. Disposed on the inner surface of display screen is a phosphor screen, or coating, 122 for emitting light in forming a video image in response to the three electron beams incident thereon.

Disposed about CRT 114 generally intermediate the electron gun 70 and magnetic deflection yoke 124 is a multipolar magnetic alignment arrangement 128. The magnetic alignment arrangement 128 is comprised of a two-pole magnet (or dipole) 130, a four-pole magnet (or quadrupole) 132, and a sixpole magnet 134. Each of the aforementioned magnets is generally in the form of a flat disc and is disposed on a rotating mount 140 which permits each of the magnets to be rotationally displaced about the CRT's envelope 116.

Referring to FIGS. 13a and 13b, 14a and 14b, and 15a and 15b, the manner in which the multi-polar magnetic alignment arrangement 128 aligns each of the upper, middle and lower electron beams 74, 76 and 78 with a respective one of adjacent horizontal scan lines will now be described. Referring specifically to FIGS. 13a and 13b, there is shown a simplified elevation view of the two-pole magnet 130 and its effect on the position of the three electron beams. As shown in FIG. 13a, rotation of the two-pole magnet 130 in a clockwise direction causes each of the three electron beams 74, 76 and 78 to be displaced uniformly in a first direction. Similarly, counterclockwise rotation of the two-pole magnet 130 as shown in FIG. 13b causes each of the three electron beams 74, 76 and 78 to be uniformly displaced in a second, opposed direction. While the directions of displacement of the three beams in FIBS. 13a and 13b are respectively shown as upward and downward, the two-pole magnet 130 may be used to uniformly move all of the electron beams in virtually any direction.

Referring to FIGS. 14a and 14b, there is shown the manner in which the four-pole magnet 132 is used to align the three electron beams on adjacent, respective horizontal scan lines on the CRT's display screen. As shown in FIG. 14a, clockwise rotation of the four-pole magnet 132 moves the upper and lower electron beams 74 and 78 toward the center electron beam 76 which remains fixed. Similarly, counter-clockwise rotation of the four-pole magnet 132 as shown in FIG. 14b causes the upper and lower electron beams 74 and 78 to move away from the center electron beam 76 which again remains fixed. The four-pole magnet 132 is thus used to move only the upper and lower electron beams 74 and 78 either toward or away from one another, while leaving the position of the center electron beam 76 unchanged.

Referring to FIGS. 15a and 15b, there is shown the manner in which the six-pole magnet 134 controls the alignment of the electron beams. As shown in FIG. 15a, clockwise rotation of the six-pole magnet 134 moves the upper and lower electron beams 74, 78 in the same direction, while leaving the position of the center electron beam 76 unchanged. Similarly, counter-clockwise rotation of the six-pole magnet 134 as shown in FIG. 15b causes the upper and lower electron beams 74, 78 to move in the opposite direction while leaving the position of the center electron beam 76 unchanged. The six-pole magnet 134 is thus used to move the upper and lower electron beams 74 and 78 in the same direction while leaving the position of the center electron beam 76 unchanged.

In summary, the two-pole magnet 130 is used to displace all three electron beams in the same direction. The four-pole magnet 132 is used to move the upper and lower electron beams 74 and 78 either toward or away from one another, while leaving the position of the center electron beam 76 unchanged. Finally, the six-pole magnet 134 is used to displace the upper and lower electron beams 74, 78 in the same direction, while leaving the position of the center electron beam 76 unchanged. The configuration and operation of the multi-polar magnetic alignment arrangement 128 is conventional and well known to those skilled in the relevant arts. Thus, the strength of each of the aforementioned magnets on the electron beams may be increased or decreased in aligning the beams by changing the size of an opening in a cover for the magnetic alignment arrangement 128 in a conventional manner. The cover for the magnetic alignment arrangement 128 is not shown in the figures for simplicity. This type of magnetic alignment arrangement is used in inline color CRTs to converge the three electron beams to a single spot on the CRT's display screen. However, when used with three vertically aligned electron beams as described herein, the conventional multi-polar magnetic convergence arrangement would be rotationally displaced 90° to accommodate the vertical beam alignment.

Figure 16:
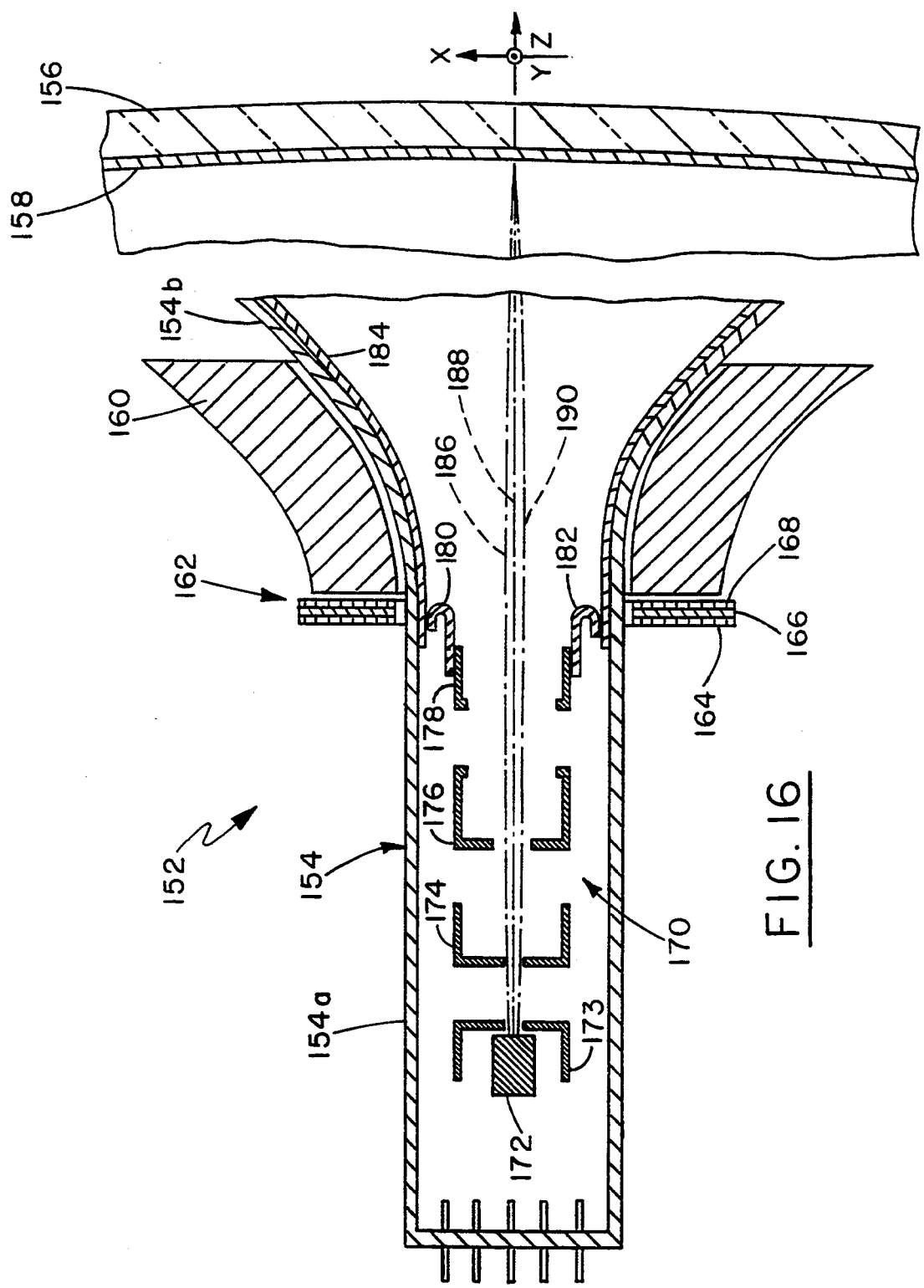
FIG. 16 is a simplified lateral sectional view of a monochrome CRT incorporating a multi-beam electron gun in accordance with another embodiment of the present invention.

Referring to FIG. 16, there is shown a sectional view of yet another embodiment of a monochrome CRT 152 incorporating a multi-beam electron gun 170 in accordance with the present invention. As in the previous embodiments, electron gun 170 includes a cathode 172, which provides energetic electrons to a BFR comprised of a G1 control grid 173 and a G2 screen grid 174. Three vertically aligned electron beams 186, 188 and 190 are formed by the G1 control and G2 screen grids 173, 174 with the three electron beams focused on and accelerated toward the CRT's display screen 156 by means of a high voltage focus lens comprised of a G3 grid 176 and a G4 grid 178. As previously described, the G4 grid 178 is coupled to an anode voltage ($V_A$) source (not shown for simplicity) by means of the combination of a plurality of positioning spacers 180 and 182 and a conductive layer 184 disposed on the inner surface of the CRT 152. The CRT 152 includes a glass envelope 154 comprised of a neck portion 154a and a funnel portion 154b. Disposed on the inner surface of the CRT's display screen 156 is a phosphor layer 158.

The electron beams are horizontally deflected across the display screen 156 by means of a magnetic deflection yoke 160 as previously described. In this embodiment of the present invention, the three electron beams 186, 188 and 190 are converged to a single spot on the CRT's display screen 156 by means of a multi-polar magnetic convergence arrangement 162. The magnetic convergence arrangement 162 is comprised of a two-pole magnet 164, a four-pole magnet 166 and a six-pole magnet 168 as previously described. In this embodiment, the three multi-pole magnets are used to converge the three vertically aligned electron beams 186, 188 and 190 on a single spot so as to trace a single scan line for each horizontal trace of the display screen. This embodiment of the present invention allows for three separate electron beams which are converged to provide an electron beam spot of enhanced brightness and resolution because each of the electron beams may be of relatively low current density. In addition, the three electron beams are formed, focused and accelerated by a single electron gun which does not require an increase in the diameter of the CRT's neck 154a. In this embodiment, all three electron beams are modulated by a single video signal source and thus all contain the same video image data.

Figure 17:
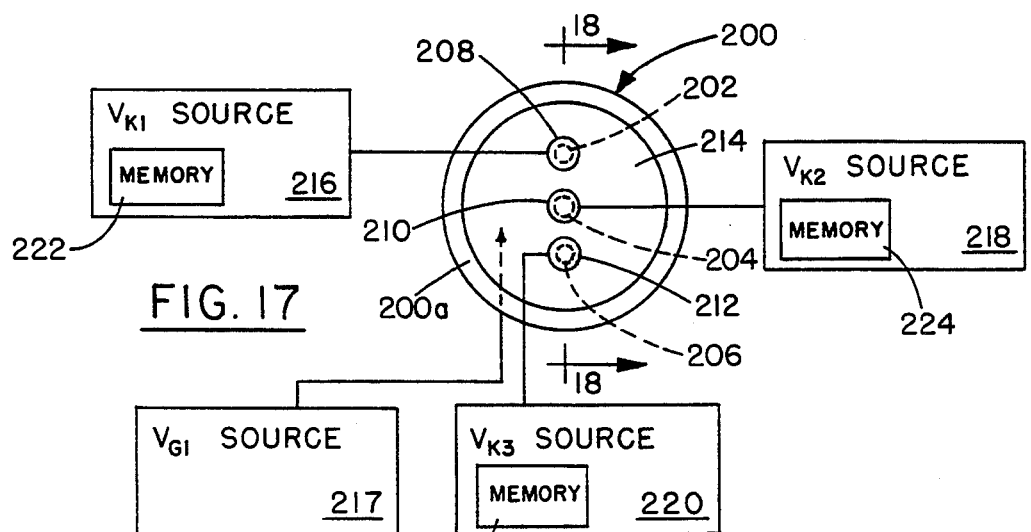
FIG. 17 is an aft elevation view of another embodiment of a cathode and G1 control grid combination for use in the present invention showing each of the cathodes coupled to a respective video signal source.
Figure 18:
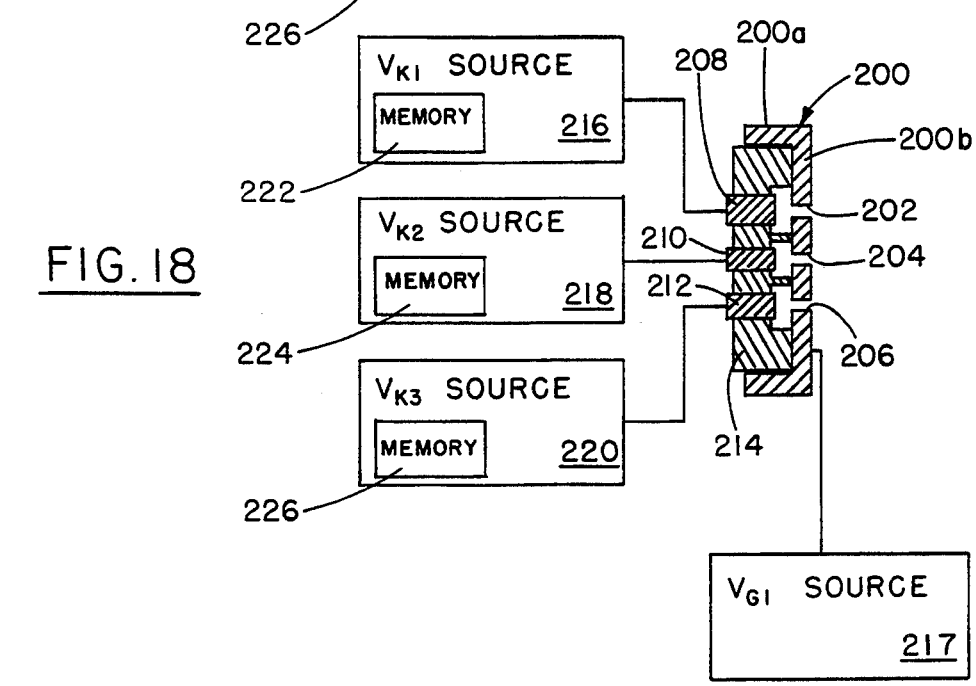
FIG. 18 is a lateral sectional view of the cathode and G1 control grid combination shown in FIG. 17 taken along site line 18—18 therein.

Referring to FIG. 17, there is shown an aft elevation view of another embodiment of a G1 control grid 200 for use in the present invention. A lateral sectional view of the G1 control grid 200 shown in FIG. 17 taken along site line 18—18 is shown in FIG. 18. The G1 control grid 200 includes first, second and third vertically aligned apertures 202, 204 and 206 disposed in the end wall 200b thereof. Grid 200 further includes a cylindrical side wall 200a. Respectively disposed adjacent to the first, second and third apertures 202, 204 and 206 are first, second and third vertically aligned cathodes 208, 210 and 212. Each of the cathodes when heated generates a respective plurality of energetic electrons which are directed through a respective adjacent aperture in the G1 control grid 200. In this manner, three spaced, vertically aligned electron beams are formed and directed toward a G2 screen grid in the electron gun which is not shown in the figures for simplicity. The three cathodes 208, 210 and 212 are inserted in respective vertically aligned apertures in a cathode retainer 214 for stable positioning within the G1 control grid 200.

Each of the three cathodes 208, 210 and 212 is coupled to and energized by a respective video signal source. Thus, the first cathode 208 is coupled to and driven by a $V_{K1}$ source 216, while the second and third cathodes 210, 212 are respectively coupled to and driven by a $V_{K2}$ source 218 and a $V_{K3}$ source 220. Each of the three video signal sources includes a respective memory for storing video information which is subsequently written to a respective one of the cathodes. Thus, the $V_{K1}$ source 216 includes a video memory 222, while the $V_{K2}$ and $V_{K3}$ sources 218, 220 respectively include video memories 224 and 226. The video information read from a respective memory by its associated video signal source circuitry is provided to a respective one of the three cathodes for modulating the electron beam associated with that cathode in providing a portion of a video image on the CRT's display screen. As opposed to the earlier embodiments described above, the G1 control grid 200 is comprised of a conductive material such as metal and is coupled to a fixed $V_{G1}$ voltage source 217 and is maintained at an essentially fixed voltage for proper biasing of the emitted electrons.

Figure 19:
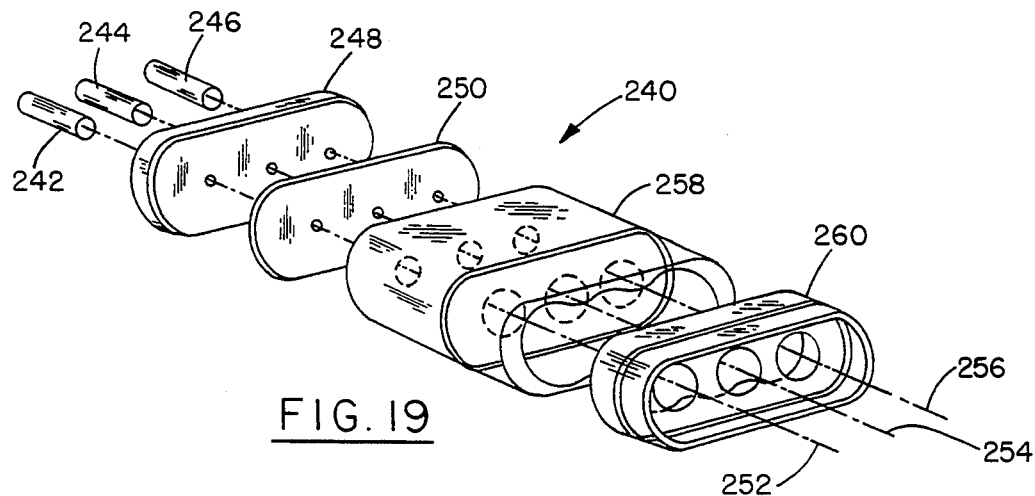
FIG. 19 is simplified isometric view shown partially in phantom of another embodiment of a multi-beam inline electron gun in accordance with the present invention for use in a monochrome CRT.
Figure 20:
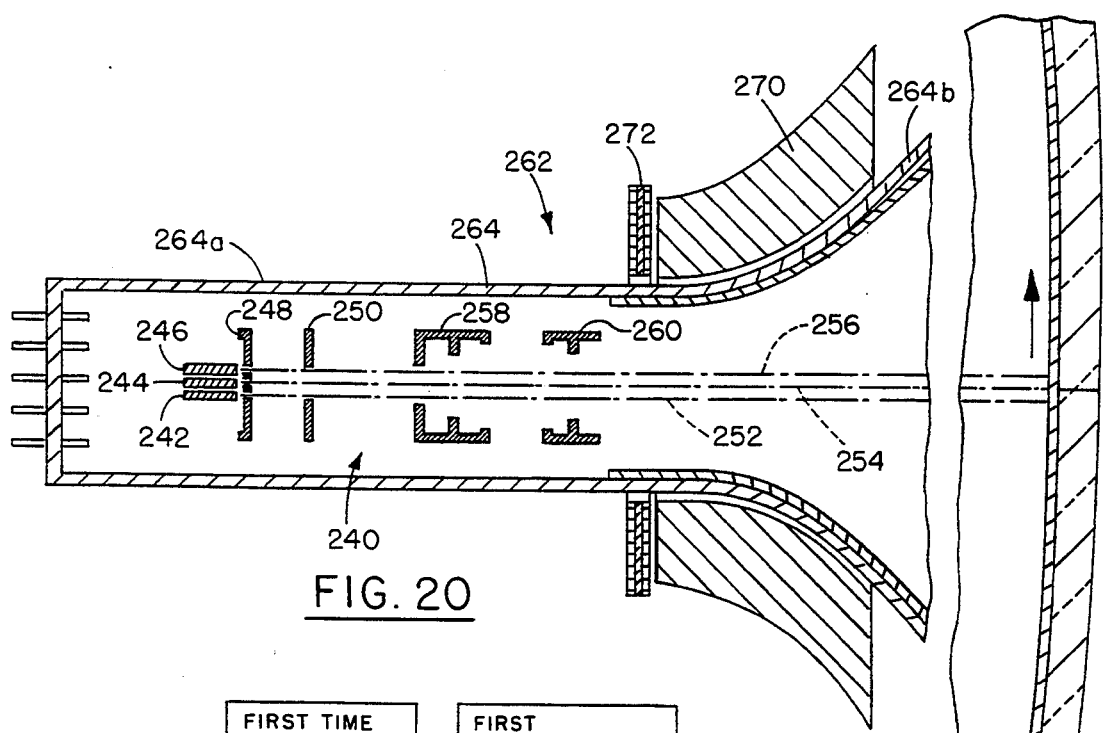
FIG. 20 is a partial horizontal sectional view of a monochrome CRT incorporating a multi-beam electron gun as shown in FIG. 19 in accordance with the present invention.

Referring to FIG. 19, there is shown a simplified isometric view shown partially in phantom of a multi-beam electron gun 240 in accordance with another embodiment of the present invention for use in a monochrome CRT. FIG. 20 is a partial horizontal sectional view of a monochrome CRT 262 incorporating the multi-beam electron gun 240 if FIG. 19. Electron gun 240 is of the bi-potential type and includes a plurality of inline cathodes 242, 244 and 246 for providing energetic electrons in the direction of a G1 control grid 248. The G1 control grid 248 in combination with a G2 screen grid 250 provides a beam forming region (BFR) in electron gun 240 for forming the energetic electrons into three horizontally inline electron beams 252, 254 and 256 shown in dotted-line form in the figures. As shown in FIG. 19 each of the G1 control and G2 screen grids 248, 250 includes three spaced, inline apertures for forming the three electron beams. Electron gun 240 further includes the combination of a G3 grid 258 and a G4 grid 260 which, in combination, form a high voltage focusing lens for focusing the electron beams on the CRT's display screen 266. Disposed on the inner surface of display screen 266 is a phosphor layer 268 for emitting light in response to the electron beams incident thereon in forming a video image on the display screen. CRT 262 includes a glass envelope 264 including a neck portion 264a and a funnel portion 264b. Disposed about the funnel portion 264b of the CRT's glass envelope 264 is a magnetic deflection yoke 270 for deflecting the three electron beams 252, 254 and 256 in unison in a raster-like manner over display screen 266 in forming an image thereon. The electron beams are sequentially deflected across a plurality of vertically spaced horizontal scan lines in the direction of the arrow shown in FIG. 20. Thus, electron beam 256 is first incident upon a given location on display screen 266, followed by sequential incidence of electron beams 254 and 252 on the same location as the three beams scan across the display screen.

Figure 21:
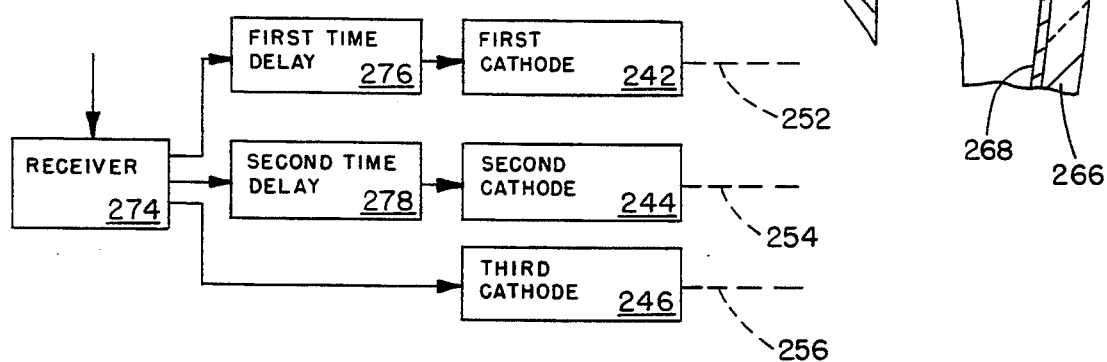
FIG. 21 is a simplified block diagram of a portion of the inventive electron gun illustrating the manner in which the video signal is provided to some of the inline cathodes is time delayed in accordance with this embodiment of the present invention.

Referring to FIG. 21, there is shown in simplified block diagram form an arrangement for providing time delayed video signals to two of the three cathodes to permit the three horizontally spaced electron beams to trace a common horizontal scan line of the video image. This arrangement allows the two trailing electron beams to irradiate each element in the phosphor layer 268 following passage of the first electron beam for enhanced video image brightness without increasing beam electron density. As shown in FIG. 21, the television signal is provided either via a cable or an antenna (not shown) to receiver circuitry 274. The received television signal is then provided directly to the third cathode 246 for modulating electron beam 256 in accordance with the video image presented on the display screen 266. The same video signal is provided also to the first and second time delay circuits 276 and 278. The first time delay circuit 276 introduces a first predetermined time delay to the video signal before providing the video signal to the first cathode 242. Similarly, the second time delay circuit 278 introduces a second predetermined time delay in the video signal before providing the video signal to the second cathode 244. The first predetermined time delay is approximately twice as long as the second time delay to permit the electron beams 252 and 254 to write the same video image information on a common spot on the display screen 266. The time delay is easily determined based upon the sweep rate of the electron beams and the horizontal spacing between adjacent electron beams.

There has thus been shown a multi-beam electron gun for use in a monochrome CRT which includes G1 control and G2 screen grids each of which has a plurality of vertically aligned apertures for forming electron beams which are deflected in unison across the CRT's display screen to simultaneously trace out a plurality of vertically spaced, horizontal scan lines with each display screen sweep. The electron beams are deflected across the screen in a raster-like manner with each beam containing video information for each adjacent scan line. In one embodiment, the G1 control grid includes a plurality of discrete conductive portions each including a respective beam passing aperture and each coupled to a respective video signal source, with each of the video signal sources including memory for storing video signal information for subsequent display. In the case of a received television signal, the video signal may be stored in memory in digitized form and subsequently read from the memory following a designated time interval, where the length of the time interval may be selected for the purpose of fine tuning the video signal such as in advancing or delaying the display of the video image one or more pixels. In another embodiment, a plurality of independent cathodes are each disposed adjacent a respective aperture in the G1 control grid which is maintained at a fixed biasing voltage. A video signal source containing a video data memory is coupled to each of the cathodes for independently driving each cathode and modulating each electron beam with video information for adjacent portions of a video image on the display screen. The invention thus permits plural adjacent scanning electron beams to simultaneously provide adjacent portions of the same frame of a video image on the display screen. The electron beams are deflected in unison by a vertically oriented, self-convergent magnetic deflection yoke. By tracing a plurality of vertically spaced electron beams each containing discrete video image data in unison across the CRT faceplate, the beam deflection rate may be reduced allowing for increased beam dwell time. The reduction in beam deflection rate relaxes operating criteria for the magnetic deflection yoke thus reducing cost and simplifying design. Increased electron beam dwell time allows for enhanced video image brightness without increasing beam current density and thus also provides for improved beam spot resolution on the CRT's display screen. In another embodiment, the three electron beams are converged and focused on a common scan line during each display screen horizontal sweep which allows for a high degree of video image brightness also without increasing individual beam current density and experiencing the associated reduction in electron beam spot resolution and associated degradation in the video image quality.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An electron gun for a monochrome cathode ray tube (CRT) including a display screen whereon a video image is formed by sweeping an incident electron beam generally horizontally over a plurality of successive vertically spaced, horizontal scan lines in a raster-like manner, said electron gun comprising:
cathode means for providing energetic electrons;
a beam forming region (BFR) disposed adjacent to said cathode means and including first and second charged grids respectively having first and second arrays of spaced apertures for forming said energetic electrons into a plurality of beams, wherein each of said first and second arrays of apertures are aligned generally vertically and wherein each aperture of said first array is aligned with a respective aperture in said second array so as to form the energetic electrons into a plurality of spaced, generally vertically aligned electron beams; and
lens means disposed intermediate said BFR and the CRT's display screen for receiving said vertically aligned, spaced electron beams and focusing the electron beams as vertically aligned, spaced spots on the display screen, wherein each electron beam is simultaneously swept over a respective scan line in forming a video image on the display screen, and wherein said lens means includes third and fourth charged grids respectively including first and second vertically elongated apertures for passing and focusing the electron beams on the display screen.

2. The electron gun of claim 1 wherein each of said first and second arrays of apertures includes three vertically aligned apertures.

3. The electron gun of claim 2 wherein said first grid includes first, second and third vertically aligned, charged portions each including a respective aperture of said first array of apertures and wherein each charged portion has an essentially equal capacitance.

4. The electron gun of claim 3 wherein said first grid further includes first and second means for defining non-conductive insulating gaps respectively disposed intermediate said first and second charged portions and intermediate said second and third charged portions.

5. The electron gun of claim 4 wherein said first, second and third charged portions are comprised of metal.

6. The apparatus of claim 5 further comprising first, second and third video signal sources respectively coupled to said first, second and third charged portions of said first grid for providing first, second and third video signals respectively thereto.

7. The electron gun of claim 6 wherein said first, second and third video signal sources include memory means for storing a received video signal for subsequent display on the display screen by a corresponding electron beam.

8. The electron gun of claim 7 wherein said third grid further includes a third vertically elongated aperture aligned with said first and second elongated apertures and wherein said first and third elongated apertures are disposed in opposed surfaces of said third grid.

9. The electron gun of claim 8 wherein said third grid includes three vertically aligned, spaced apertures through each of which a respective electron beam passes.

10. The electron gun of claim 7 wherein said first and second charged grids are a G1 control grid and a G2 screen grid, respectively.

11. The electron gun of claim 10 wherein said third and fourth charged grids are a G3 grid and a G4 grid, respectively.

12. The electron gun of claim 11 wherein said first and second arrays of apertures are disposed in adjacent, facing portions of said G1 and G2 grids.

13. The electron gun of claim 11 wherein said vertically aligned, elongated apertures are disposed in adjacent, facing portions of said G3 and G4 grids.

14. The electron gun of claim 1 wherein each of said first and second arrays of apertures includes two vertically aligned apertures.

15. The electron gun of claim 14 wherein said first grid includes first and second vertically aligned, charged portions each including a respective aperture of said first array of apertures and wherein each charged portion has an essentially equal capacitance.

16. The electron gun of claim 15 wherein said first grid further includes a non-conductive portion disposed intermediate said first and second charged portions.

17. The electron gun of claim 16 wherein said first and second charged portions are comprised of metal and said non-conductive portion includes means for defining a non-conductive insulating gap in said first grid.

18. The apparatus of claim 17 further comprising first and second video signal sources respectively coupled to said first and second charged portions of said first grid for providing first and second video signals respectively thereto.

19. The electron gun of claim 18 wherein said first and second video signal sources include memory means for storing a received video signal for subsequent display on the display screen by a corresponding electron beam.

20. The electron gun of claim 19 wherein said first and second charged grids are a G1 control grid and a G2 screen grid, respectively.

21. The electron gun of claim 20 wherein said first and second arrays of apertures are disposed in adjacent, facing portions of said G1 and G2 grids.

22. A G1 control grid for a monochrome cathode ray tube (CRT) adapted to receive energetic electrons from a cathode, said grid comprising:
upper and lower conductive portions each adapted for coupling to a respective video signal source;
means defining a non-conductive insulating gap disposed intermediate said upper and lower conductive portions; and first and second vertically aligned, generally circular apertures respectively disposed in said upper and in said lower conductive portions, wherein each of said apertures forms the energetic electrons into a respective electron beam;

wherein said grid is comprised of a cup-shaped ceramic body having a first open end in facing relation to the cathode and a second, opposed closed end including said conductive portions and said insulating gap, and wherein each of said conductive portions is comprised of metal.

23. The grid of claim 22 wherein said apertures are spaced on the order of 50 mils apart center-to-center.

24. The grid of claim 23 wherein each of said upper and lower conductive portions have essentially the same capacitance.

25. (Amended) The grid of claim 24 wherein said means defining said non-conductive insulating gap includes means defining a linear gap disposed intermediate said first and second conductive portions.

26. The grid of claim 25 wherein said grid is comprised of a ceramic substrate having upper and lower brazed metal portions on the second closed end thereof.

27. The grid of claim 26 wherein said insulating portion is formed by etching said upper and lower brazed metal portions.

28. The grid of claim 25 wherein said grid is comprised of a ceramic substrate having upper and lower crimped-on metal portions.

29. The grid of claim 28 wherein said insulating portion is formed by etching said upper and lower crimped-on metal portions.

30. A G1 control grid for a monochrome cathode ray tube (CRT) adapted to receive energetic electrons from a cathode, said grid comprising:

upper, intermediate and lower conductive portions each adapted for coupling to a respective video signal source;

means defining first and second non-conductive insulating gaps respectively disposed between said upper and intermediate conductive portions and between said intermediate and lower conductive portions; and first, second and third vertically aligned, generally circular apertures respectively disposed in said upper, intermediate and lower conductive portions, wherein each of said apertures forms the energetic electrons into a respective electron beam;

wherein said grid is comprised of a cup-shaped ceramic body having a first open end in facing relation to the cathode and a second, opposed closed end including said conductive portions and said insulating gap, and wherein each of said conductive portions is comprised of metal.

31. The grid of claim 30 wherein said apertures are spaced on the order of 50 mils apart center-to-center.

32. The grid of claim 31 wherein each of said upper, intermediate and lower conductive portions have essentially the same capacitance.

33. The grid of claim 32 wherein said means defining said insulating gaps includes means defining first and second spaced gaps in said grid.

34. The grid of claim 33 wherein said grid is comprised of a ceramic substrate having upper, intermediate and lower brazed metal portions on a closed end thereof.

35. The grid of claim 34 wherein said first and second insulating gaps are formed by etching said upper, intermediate and lower conductive portions.

36. The grid of claim 33 wherein said grid is comprised of a ceramic substrate having upper, intermediate and lower crimpedon metal portions and wherein said first and second insulating gaps are formed by etching said crimped-on metal portions.

* * * * *

UNITED STATES PATENT AND TRADEMARK OFFICE
CERTIFICATE OF CORRECTION

PATENT NO. : 5,389,855
DATED : February 14, 1995
INVENTOR(S) : Hsing-Yao Chen

It is certified that error appears in the above-indentified patent and that said Letters Patent is hereby corrected as shown below:

On the title page: Item [75] change "Prov. of China" to --Republic of China --.

Signed and Sealed this

Twenty-ninth Day of August, 1995

Attest:

BRUCE LEHMAN

*Attesting Officer*     *Commissioner of Patents and Trademarks*